No. 697,919. Patented Apr. 15, 1902.
E. KEMPSHALL.
GOLF BALL.
(Application filed Jan. 29, 1902.)
(No Model.)

Witnesses:
Calderon C. Fuss
F. E. Maynard

Inventor:
Eleazer Kempshall
By his Attorney
F. H. Richards.

UNITED STATES PATENT OFFICE.

ELEAZER KEMPSHALL, OF BOSTON, MASSACHUSETTS, ASSIGNOR TO THE KEMPSHALL MANUFACTURING COMPANY, A CORPORATION OF NEW JERSEY.

GOLF-BALL.

SPECIFICATION forming part of Letters Patent No. 697,919, dated April 15, 1902.

Application filed January 29, 1902. Serial No. 91,690. (No model.)

*To all whom it may concern:*

Be it known that I, ELEAZER KEMPSHALL, a citizen of the United States, residing in Boston, in the county of Suffolk and State of Massachusetts, have invented certain new and useful Improvements in Playing-Balls, of which the following is a specification.

This invention relates to springy playing-balls, and especially to those to which it is desired to impart great momentum, so that they may fly a long distance.

The object of my invention is to minimize the distortion of the ball by a blow, so as to avoid waste of driving force in changing and restoring its shape. I also aim to produce a ball having uniform action, so that a given blow may always produce the same result, and also possessing a high degree of liveliness.

Figure 1:
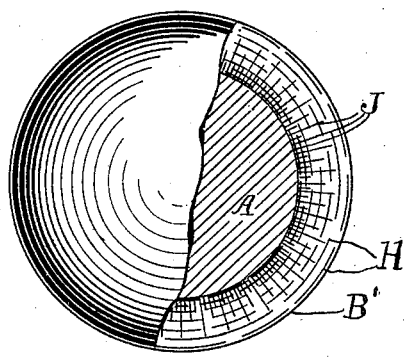
Figure 2:
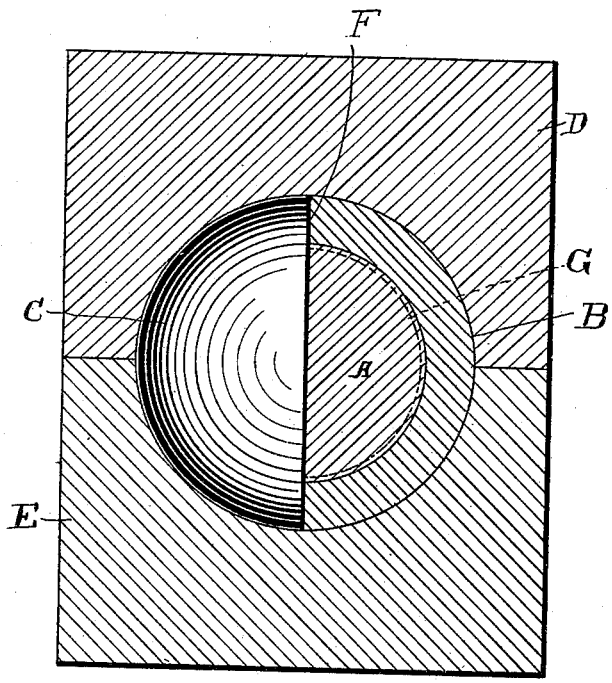

In the drawings forming part of this specification, Figure 1 is a view of a ball made in accordance with my improvements and partly broken away so as to exhibit its construction. Fig. 2 illustrates a stage in its manufacture.

In the views similar parts are designated by similar letters of reference.

Upon a compressible resilient core A, I place hemispherical sections of uncured soft rubber B and C, and the parts thus assembled I inclose in sections D and E of a metallic mold. These sections, while held firmly together in any convenient way, are subjected to sufficient heat to vulcanize or cure the rubber and cause the segments to join or weld at F, the edges thereof having first been prepared for adhesion, if desired. During the vulcanizing process the rubber expands somewhat in bulk, and the mold D E being made tight the rubber in expanding acts upon the core, slightly compressing the same, as indicated diagrammatically by a dotted circle G.

Upon removing the ball from the mold the resilient but compressed core A tends to recover its bulk, and hence expands the yielding rubber envelop B', Fig. 1, thereby stretching said envelop throughout, as indicated diagrammatically by broken curved lines at H. It will also be understood that the longitudinal tension of the exterior portion of said envelop has the effect of compressing the interior portion thereof, as indicated by radial lines J, while, owing to the resistance of the entire envelop to distortion or expansion, the core A is still held under a degree of compression.

For the core A, I recommend gutta-percha of such a consistency that its bulk may be compressed. Other material, however, may be used, such as firm highly-vulcanized rubber in such form or of such consistency as to be compressible in bulk.

It will be perceived that the material of the entire ball from center to periphery is in an abnormal condition, the core being under compression and the envelop being both compressed and longitudinally tensioned, so that an extraordinary degree of efficiency is attained, every affected particle of the ball acting with promptness and vigor in response to a blow. Although the outer part of the shell or jacket is in a soft condition and effectually cushions the blow of an implement, still the effect of a blow is different from the effect upon a ball having a uniform softness of texture throughout. In the latter case a severe blow would violently distort the ball instead of giving the same impetus, whereas in my ball the softness resides only at the surface, and as soon as this slight resistance is overcome a hgh resistance is met, due to the presence of the relatively hard solid core, which not only itself absorbs momentum from the implement, but also by reason of its solidity prevents undue distortion of the ball, so that nearly all of the force going from the implement to the ball is utilized to impart velocity thereto. It will also be understood that under the shock of a blow the solid core is slightly displaced from its true central position, thereby affecting somewhat the material of the envelop at the opposite side of the ball from the implement and also affecting other portions of the envelop, so that almost if not all the material of the envelop is called into action and instantly reacts, thereby imparting a high degree of activity or liveliness to the ball and causing the same to leave the implement at high velocity. Only a slight distortion is produced at any portion of the ball, whose entire mass is thus rendered active in restoring the ball to its original spherical shape, and hence in reacting against the implement. It will be understood that the result of the blow will depend upon the velocity and weight of the implement, as well as upon the weight of the ball, the depth of the depression produced in the ball, and especially upon the ratio of increase in resistance offered thereby. In this instance this ratio is very high, the ball feeling quite soft to a light touch, but offering a hard resistance to pressure. The ball thus has practically all the desirable qualities of the usual soft-rubber ball and also a phenomenal flying or carrying power.

Owing to the rapidly-increasing resistance even a heavy blow effects only a slight distortion of the envelop and that only over a small area thereof, so that very little force is absorbed in changing and rechanging the form of the ball. Moreover, the period during which the driver may continue to deliver power into the ball itself is increased, with the result of giving to the ball a longer flight. The compressed core not only retains the envelop in an expanded state, but also supports the same when struck, and by the combined elasticity of core and envelop an extremely active and powerful ball is produced. By having the interior of the rubber envelop or coating in a state of compression while the outer portion is in a state of longitudinal tension the efficiency of the ball is improved and the envelop is not merely an inert portion having no force or tension except that which is directly caused by a driver.

An important advantage of my invention resides in the durability of the finished ball, since instead of employing the partially-cured rubber threads of which balls are wound, which are susceptible to many deleterious influences, I employ rubber of firm texture and highly vulcanized, and hence not liable to deterioration, so that the ball not only withstands severe usage, but remains in its original elastic condition for a long time. In the rubber-thread balls it is usual to stretch the thread nearly to the breaking-point while winding, and owing to such violent treatment the thread rapidly loses its life, particularly since it is not well cured, while in my ball better results are obtained by subjecting rubber which is well cured to considerably less tension, thereby conducing to long life of the ball. Further, by tensioning the rubber after the manner of my invention it is given a promptness in action which is not possible in a rubber-thread ball, the action of the inner layers whereof is seriously impeded by the binding effect of the outer layers of thread. Moreover, in a rubber-thread ball the tension is in only one direction, whereas in my elastic envelop the tension is in all directions around the circumference of the ball, and hence the activity of all of the particles of the rubber envelop is fully developed, or, in short, the ball carries no dead-weight. Moreover, the ball thus formed has a uniform solidity or density which is not found in a thread ball on account of its interstices, and hence the same blow always produces the same results, enabling the user to play to better advantage.

Modifications and variations may be resorted to within the scope of my invention. The claims herein are intended to cover a ball whether considered as complete and ready for use or as incomplete and intended only for the nucleus or filling of a larger ball. One of the principal distinctions between my envelop and the common wound balls resides in the fact that in the latter the rubber at any part is tensioned in only one direction—viz., longitudinally—while in my elastic envelop the tension at any point is in all directions circumferentially of the ball.

The herein-disclosed process is made the subject-matter of my other pending application, Serial No. 91,691, filed January 29, 1902.

I am aware of the pending application of Francis H. Richards, filed December 3, 1901, Serial No. 84,529, and I do not claim herein any feature set forth in said application.

Having described my invention, I claim—

1. A ball consisting of a spherical envelop of solid soft rubber cured upon a compressible resilient core; which by its inherent expansive tendency permanently maintains said envelop in a state of tension.

2. A ball consisting of a solid soft-rubber envelop cured upon a gutta-percha sphere, which by its inherent expansive tendency constantly stretches said envelop.

ELEAZER KEMPSHALL.

Witnesses:
JOHN O. SEIFERT,
B. C. STICKNEY.